April 29, 1952  D. B. VINCENT  2,595,180
PROCESS FOR TREATING FISH PRESS FLUIDS
Filed Sept. 30, 1948  2 SHEETS—SHEET 1

Fig. 1

INVENTOR.
DANIEL B. VINCENT
BY
Beale and Jones
ATTORNEYS

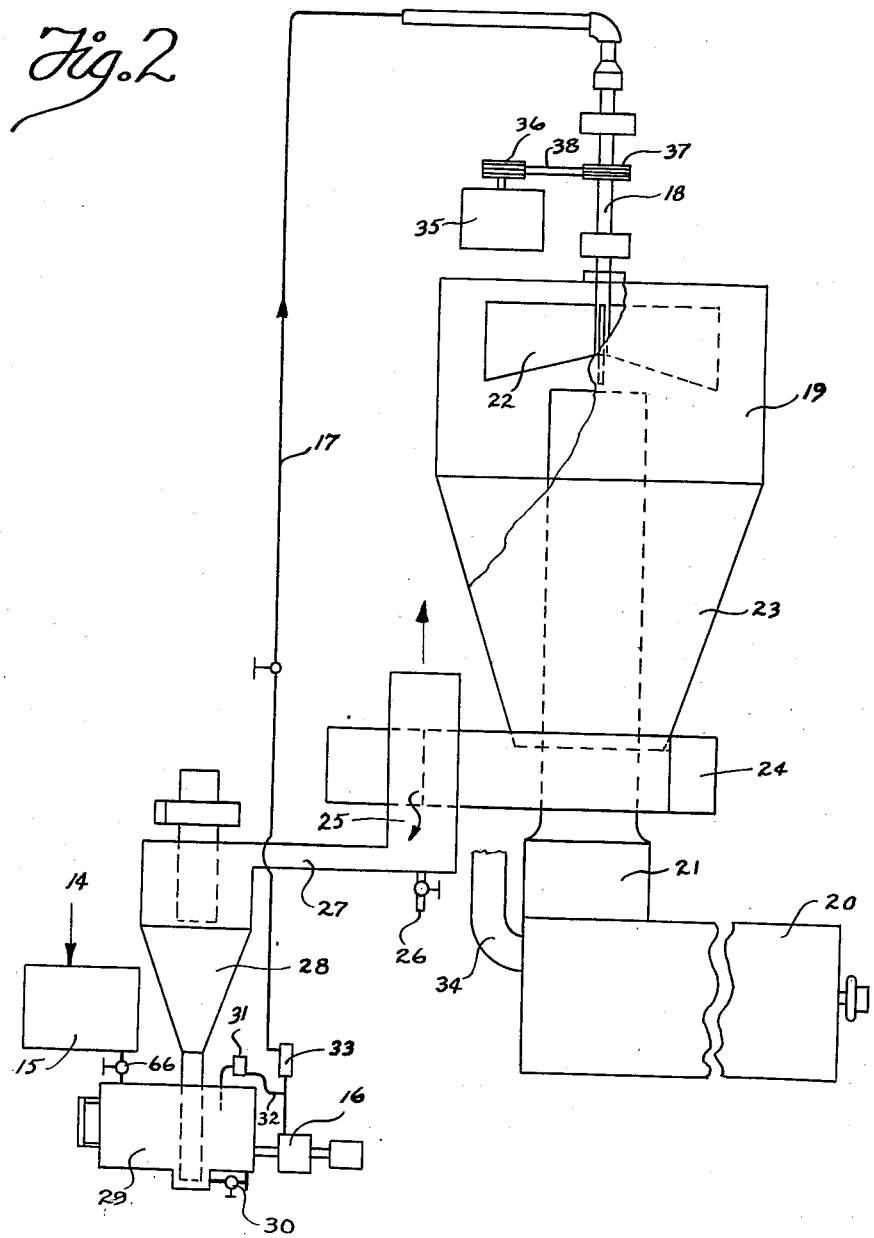

Patented Apr. 29, 1952

2,595,180

UNITED STATES PATENT OFFICE 2,595,180

PROCESS FOR TREATING FISH PRESS FLUIDS

Daniel B. Vincent, Tampa, Fla., assignor to Dan B. Vincent, Inc., Tampa, Fla., a corporation of Florida Application September 30, 1948, Serial No. 51,983

10 Claims. (Cl. 99—2)

This invention relates to a process of treating the fluids obtained by pressing oil-containing fish and for recovering useful products therefrom.

A considerable industry has been built up adjacent the coastal waters of the United States, and other countries, in catching, and utilizing the products obtained from, various species of relatively inedible, oil-containing fish, such as menhaden, herring, mackerel, sardines and the like. In the earlier days of this industry, the primary objective of the industry was the solids or fish meal obtained by expressing all, or as much as possible, of the fluids from whole fish while retaining the solids, additionally drying the said solids and distributing such dried solids as fertilizer or for admixture with other fertilizers. The expressed fluids were discarded as waste.

Later, the oil content expressed from the solids was found to have advantageous uses among which was a source of vitamins. The oil, more or less refined, was utilized as a vitamin concentrate and as a component for feeds for livestock and poultry, and in some cases for human consumption. The non-oleaginous portion of the body fluid of the fish was discarded as waste.

Later, some efforts were made to utilize the solid content of these non-oleaginous fluids which were both in solution and in suspension in the fluid, as a source of valuable materials. Depending upon the species of fish and to a certain extent upon other conditions, it is well recognized that the usual oil-bearing fish contains from 10 to 20 per cent of oil, approximately 20 per cent of solids and the remainder of water. In addition to the whole fish of the type mentioned above, certain other types of fish such as cod fish or sharks have internal organs which are sources of valuable oils, thus for example the livers of cod fish contain approximately 20 to 60 per cent of oil, approximately 60 to 30 per cent of water and the remainder consists of solids or semi-solids.

In the treatment of oil-bearing fish or the oil-containing organs of fish, such as those discussed above, it has been found desirable to subject either the whole fish or the desired organ to a preliminary cooking step, or sterilization, for the purpose of softening the bones or cartilages of the fish and breaking down the cellular oil-bearing structures. Following the cooking step, the whole fish or the selected organ is subjected to a pressing operation for expressing the watery fluids and oils from the solids. This invention does not concern itself with the utilization of the solids from which the oil and moisture has been expressed but does concern itself with the expressed oil and moisture.

It has been the experience of the industry that the fluids obtained by the pressing operation, discussed above, are a mixture of oil, water, and solids (which may be either in solution or in suspension in the fluids), as well as oil-in-water emulsions and water-in-oil emulsions. It has been more or less conventional to discharge the expressed fluids, containing the components discussed above, into one or more settling tanks wherein, in the passage of time, three fairly distinct phases become observable. The top phase is a layer of oil, which may contain some water emulsified therein and the bottom phase is water, which may contain some oil emulsified therein as well as some solids dissolved or suspended therein. At the bottom of the water phase a visible solid, sedimentary deposit settles out as a third phase. Numerous prior workers in the art have directed their efforts toward methods of effecting a clean separation between the oil phase and the water phase and between the water phase and the solid phase. One of the reasons which has impelled these efforts has been the fact that the solids in the water phase expressed from the fish, unless subjected to some drastic type of treatment, have been found to decompose very rapidly. Accordingly there have been granted a number of patents directed toward the treatment of the expressed water phase for the purpose of separating suspended solids as well as some dissolved solids and also recovering oil emulsified therein. Examples of these prior methods appear in U. S. Patents 1,840,715; 2,118,008 and 2,372,677. In general, it may be stated that prior art shows the importance of utilizing a filtration step, or a centrifuging step, or a chemical precipitating step or a coagulating step as an indispensable operation in the recovery of stable, desirable products from the aqueous phase of the fish body fluids. Even so, it has been found that with conventional heating, necessary to concentrate or dehydrate the solids from such aqueous fluids, fermentation sets in and results in products which decompose with undesired rapidity.

This invention has for an object the treatment of the aqueous portion of the pressed body fluids without separating any suspended or dissolved solids and without separating any oil-in-water emulsion therein, and concentrating this relatively crude mixture as such to produce a product which is suitable as an animal feed or a poultry feed and which contains a maximum percentage of the original food ingredients and vitamin content thereof. A further object is the production of such a product which is stable, does not decompose or ferment in storage, or in processing, and which may, if desired, be further concentrated to dryness without difficulty and without decomposition.

The invention is diagrammatically illustrated in the accompanying drawings in which Figure 1 shows, diagrammatically, the various steps in the process and Figure 2 shows, diagrammatically, one form of concentration procedure by which the product may be concentrated. In the drawings like reference numbers refer to like or similar elements.

In Figure 1 there is shown, diagrammatically, the hull of a conventional fishing craft in the hold 1 of which is a catch of oil-bearing fish such as menhaden. The fish are charged to the bottom of an elevator 2 and discharged at the dock-side into some form of measuring device 3 from which uniform quantities are discharged into conveyor 4 and then charged into a cooker 5. Within the cooker 5 the fish are cooked for a desired period of time, such as six minutes, preferably, but not necessarily, by means of live steam. The cooked batch of fish is then discharged into one of a battery of presses 6 which compresses the mass of cooked fish and expresses the fluid contents thereof. The dried or partially dried solids produced in the press are withdrawn onto a conveyor 7 and processed as desired. The fluids are conveyed by line 8 where they may or may not be passed through a supplemental filter or press 9 for the purpose of collecting any large fragments of solids which may have escaped the initial pressing operation; the fluids are then discharged into settling tanks 10, 11, and 12 where they may be alternatively or progressively permitted to rest in a state of quiescence for a period of about six hours. During the settling operation, the oils rise to the top and the aqueous fluid, together with undissolved solids settle to the bottom. A somewhat cleaner separation of the oil from the other components of the pressed fluids may be obtained by permitting the oil from tank 10 to overflow into tank 11, further settling taking place therein, after which the oil from tank 11 overflows into tank 12 where even further settling takes place. The oil substantially freed from aqueous fluid and from the heavier undissolved solids may be withdrawn through line 13 and refined in any desired manner.

The aqueous part of the press fluid, together with any undissolved solids and oil-in-water emulsion as well as with solids dissolved therein, is withdrawn from the several settling tanks 10, 11 and 12 through line 14 and passed into receiving tank 15. From the receiving tank 15 the fluids may be charged directly into line 17 or they may be blended with fluids recycled from a later stage of the operation as will be explained hereinafter. From line 17 the fluids are pumped by pump 16 into a hollow shaft 18 which depends into a separating chamber 19. Within chamber 19 and at the lower end of hollow shaft 18 are affixed a plurality of blades 22 which are capable of rapid rotation around the vertical axis of the hollow shaft 18.

Shaft 18 is supported at a plurality of points by suitable collars, each provided with suitable bushings for the purpose of restraining shaft 18 in desired vertical position yet permitting rapid rotation around the vertical axis of the shaft. The desired rotation of the shaft, and its attached fan blades, is imparted by a suitable rotor 35 in conjunction with pulleys 36 and 37 and belt 38.

20 is a burner in which a suitable fuel, preferably fuel oil is burned in the presence of sufficient air to oxidize the combustible fuel and to form flue gases which are substantially free of oxygen. The flue gases are withdrawn from burner 20 by means of stack 21 which terminates within chamber 19 and at a point which is just below the path of rotation of the blades 22. The lower portion of chamber 19 is shaped like an inverted frustrocone 23, the lower end of which discharges into conduit 24. Desirably, conduit 24 is shaped in the form of a helix so as to impart a whirling motion to the material passing therethrough. The outer whorl of conduit 24 terminates in a conduit 25 the upper or outer end of which is open for the discharge of combustion gases therefrom. Liquids descending through and draining from conduit 24 drop to the bottom of chamber 25 and may, if desired, be withdrawn through valved line 26. Alternatively, the liquids may be passed through conduit 27 and into a vacuum chamber 28 which discharges into a sump at the bottom of mixing tank 29. From this sump liquid products may be withdrawn through valved line 30, or alternatively, they may be mixed with fresh stock introduced from tank 15 and the mixture then charged to line 17; or, without mixing with fresh stock, the liquids may be recycled through the chamber 19 by means of pipe 32 and thence introduced into the feed line 17.

Various methods may be utilized for drying or dehydrating the pressed liquids providing they follow the principles of this invention. These principles will be explained more in detail hereinafter. However, for the purpose of illustrating my invention, I have shown in Figure 2 a form of primary heating or evaporating chamber supplemented by a supplemental vacuum chamber as illustrated and described in Figure 1 of my co-pending application Serial No. 632,469, filed December 3, 1945. However, as illustrated in Figure 5 of the said co-pending application the primary evaporating chamber may be supplemented by a secondary chamber similar to the design of the primary chamber but operating at lower input gas temperature. In Figure 1 of the drawings of the present application, I have illustrated an even different form of vacuum chamber. In the arrangement of Figure 1 the products discharged from conduit 24 enter a separating chamber 48 from the bottom of which the heavier and liquid products may be withdrawn and introduced into a receiving tank 15. In tank 15 the products may be recycled as indicated by the arrows or they may be withdrawn through line 56 thence pumped into a receiving tank 58 and there subjected to further treatment as will be described. The gaseous products discharged from conduit 24 pass upwardly and into the top of chamber 25 and are withdrawn through conduit 49 and charged into a secondary or heat exchange chamber 50. In heat exchanger 50, which is preferably of the tubular vacuum pan type, and which will desirably have as one of its elements a suitable barometric condenser (not shown), the stock will be deprived of more of its moisture content and the gases with removed water will eventually be withdrawn and discharged through stack 51. Stock after being concentrated in the heat exchanger 50 is withdrawn at the bottom thereof through line 53 and charged to receiving tank 58. Portions of this stock may be mixed with fresh stock introduced through line 57 and the mixture withdrawn through line 60, being pumped by pump 59 into the heat exchanger 50. A suitable treating agent may be introduced into receiving tank 58 through line 61 being pumped by pump or elevator 62. The final product from the system is withdrawn through line 63 and pumped into delivery line 65 by means of pump 64.

Mode of operation

The essentially liquid phase withdrawn from settling tanks 10, or 11, or 12 has, as has been stated above, some solid content, both in suspension and in solution, and some oil content generally in the form of oil-in-water emulsion. There may be also some particles of solids which are too heavy to remain suspended in this fluid. My process differs at the outset in passing this relatively crude mixed material to a heating step without subjecting the material to any refining methods designed to separate solid particles or to precipitate or coagulate proteins or to break any emulsion. The material which I use at this stage of my process is one which I believe has been considered un-useable without special efforts to purify it and break it up into components. For the purposes of defining this material so as to avoid detailed explanations, in this specification and in the appended claims, I term my stock material "unrefined fish stick."

The unrefined fish stick is pumped through line 17, without any added chemicals or ingredients, into the hollow shaft 18. The base of shaft 18 is imperforate. Just above the base of the shaft 18 the vanes 22 are mounted. The shaft is perforated between the junctions of the several fan blades so as to permit fluid to be discharged through the perforations and on to the fan blades. Both shaft 18 and its supported fan blades 22 are rotated at a fairly rapid rate such as for example 600 revolutions per minute or higher. The path of the liquids is from shaft 18 outwardly to the extremities of the blades. The rotation of the fan creates at least a partial vacuum adjacent the blade tips. The fan is rotated immediately above the discharge end of conduit 21 and the fluids being thrown off from the fan blades are subjected to the heat from the hot products of combustion being discharged from conduit 21. The gases at the point of introduction into chamber 19 are at temperatures between about 1200° F. and about 1600° F.; a fair average temperature is 1400° F. At the tip of the fan blades the temperature, even with gases introduced at such high temperatures is maintained between about 150° F. and 170° F. The unrefined fish stick being thrown off from the fan blades is in the form of discrete globules. This physical condition coupled with the at least partial vacuum in that area results in a very rapid heat exchange between the heating gases and the unrefined fish stick and results in a very rapid loss of some of the moisture content of the unrefined fish stick without scorching or overheating the solids. A further important feature at this stage of the process is that the gases being introduced through pipe 21 contain a minimum of free oxygen. Practically all of the oxygen, from the air necessary to support combustion has been converted to carbon dioxide and steam although for efficient combustion a slight excess of air is generally initially used. Consequently, the evaporation of the moisture from the unrefined fish stick not only takes place under mild temperature conditions but also takes place in an essentially non-oxidizing atmosphere. Notwithstanding the high initial temperature of the combustion gases introduced into chamber 19, the unrefined fish stick, which is initially introduced at prevailing room temperature, is raised in temperature to between about 150° F. and about 170° F. while the combustion gases are reduced in temperature to not more than a few degrees above this said temperature range. The unrefined fish stick as initially charged into my system may contain in the neighborhood of 6% of its weight in solids and other non-aqueous elements. A large proportion of this approximately 94% water content of the unrefined fish stick is evaporated in chamber 19. The liquid concentrate is thrown off by the fan blades onto the walls of chamber 19, flows down the inclined surfaces of the conical chamber 23 and into the conduit 24. As explained above, conduit 24 is preferably helical in shape and tends to impart a whirling movement to the gases and liquids discharged into it. This whirling movement increases the separation of the heavier, and concentrated, liquid portions and deprives the gases of particles of such liquid which are being physically carried along with the gases. In the modification shown in Figure 1 of the drawings, the heavier concentrated liquids are permitted to flow from the bottom of separating chamber 48 into receiving tank 15. In the modification shown in Figure 2 of the drawings, the liquids are permitted to flow from the lower portion of chamber 25 while the gases, together with evaporated moisture, may be discharged as exhaust. In a batch process the concentrated liquids may be withdrawn as a product from pipe 26. Alternatively, they may be recycled back into pipe 17 and into chamber 19 for the removal of additional moisture and further concentration. This recycling step is shown in both the modifications in Figure 1 and Figure 2.

I prefer, however, to accomplish the concentration of the unrefined fish stick by continuous method in which the concentrated liquids after once passing through chamber 19 are admixed with fresh unrefined fish stick and the mixture then passed through chamber 19 so as to get a controlled and incremental concentration. Increments of the finally concentrated product may be withdrawn as such, if desired, or they may be subjected to further treatment. Thus, in the modification shown in Figure 1, the concentrated fish stick may be withdrawn from tank 15 by line 56 and charged into tank 58 where increments of this partially concentrated fish stick may then be pumped into evaporator 50. In evaporator 50, which may be of the vacuum pan type, I prefer to use the latent heat of the exhaust gases discharged from chamber 19. Where I use such exhaust gases, these gases leave the chamber 19 at about 175° F. and are saturated with water vapor; they are conveyed through duct 49 and thence over the tubes within chamber 50. The partially concentrated fish stick is pumped through the said tubes in chamber 50 under a vacuum of about 21 inches. Under such conditions the liquid in the tubes in indirect heat exchange with the heating gases, will boil at about 120° F. As the saturated gases pass over the tubes in chamber 50 the gas temperature is reduced to about 150° F., this causes condensation of about 50% of the initial water vapor content of such gases, within chamber 50, the release of an equivalent amount of heat to the tubes and the consequential evaporation of water from the concentrating fish stick within the tubes. The temperature of the evaporating liquids and the heating gases is thus kept at such a low temperature that damage to the product is prevented. The evaporated water from the fish stick may be separated therefrom, after discharge from the tubes, by a barometric condenser, the product thus concentrated may be discharged into tank 58 and recycled or withdrawn as desired.

Prior art workers have taught that in the concentration of unrefined fish stick it is essential at the outset, to avoid fermentation and ultimate decomposition, to adjust the pH to a position below neutrality and preferably between pH 5 and pH 6. I have found that such preliminary adjustment of the pH is unnecessary and, in fact, the adjustment of the final product is not absolutely essential. However, I do obtain desirable results by adding an acidic material to the final concentrate just prior to discharging it and packaging it. I have tried a number of reagents such as sodium chloride, sulphuric acid and phosphoric acid, but I prefer phosphoric acid. I add between about 0.5% and 5.0% of phosphoric acid to the finally concentrated fish stick and withdraw the thus treated concentrate. The addition of the phosphoric acid seems to accomplish several desirable results. It seems to have a stabilizing and preservative effect on the final concentrate. Where the concentrate is being prepared for use as a stock feed or poultry feed, the available phosphate in the treated concentrate makes the feed a more nutritious and beneficial one. Lastly, it seems to have a desirable effect in maintaining the pH of the final concentrate at about pH 5.5, which I have found to be the most desirable degree of acidity for the finished product.

As stated above, the unrefined fish stick charged to the process may contain, and usually does contain, about 6% of solids and about 94% of moisture. In the embodiment illustrated in Figure 1, I may charge the unrefined fish stick at a rate of about 400 pounds per minute. The finally concentrated fish stick which is discharged from chamber 50 may have a moisture concentration of about 50%. With the recycling of partially concentrated fish stick, the total throughput into chamber 19 is about at the rate of 2500 pounds per minute. The partially concentrated fish stick discharged from chamber 19 will have a temperature of between about 150° F. and 170° F. and in the modification disclosed in Figure 1 of the drawings, the finally concentrated fish stick discharged from chamber 50 will be at a temperature of about 100° F. to about 130° F. Generally, the product discharged from the vacuum chamber 29 and drawn off from valved line 30 in the modification of Figure 2 of the drawings will be at about 100° F. to about 130° F. At this temperature the final concentrate will have appreciable fluidity similar to that of a freely flowing syrup but upon cooling to room temperature, the concentrate will partially solidify into a gellike mass. In appearance it is very viscous and may vary between a grey color and a brown color. The variation in color depends somewhat upon the amount of insolubles in the original unrefined fish stick. Where the insoluble content in the unrefined fish stick is high, the resulting concentrated product will show visible particles of suspended solids in the gel-like mass and this product will have a mild but not unpleasant fish odor. Where the unrefined fish stick had a low initial content of suspended solids, and where, therefore, the concentration was performed on an unrefined fish stick which had a high proportion of dissolved solids, the resulting product will be browner in color. There are fewer discernable solid particles in suspension and the odor of this product is more like that of a beef extract.

The conditions emphasized above as existing in the primary evaporating chamber 19 wherein the evaporating agent is a non-oxidizing atmosphere, wherein the unrefined fish stick is atomized and subjected to heat and rapid heat exchange while in a finely atomized condition, and wherein the temperature of the unrefined fish stick is carefully maintained between about 150° F. and about 170° F. has, I believe, very important effect on the ultimate product obtained by my process. I am not prepared to advance any empirical theory by way of explanation of the advantages of my process but I have made certain observations which I believe to have some significance. The solids present in the unrefined fish stick, whether they are in solution or in suspension contain a plurality of complex organic compounds. Some of these compounds are vitamins, some are various types of proteins. It has been recognized by research workers in the past that in general, the more complex the compound the less its stability in the presence of heat. I, therefore, deem it extremely desirable to conduct the heating of the unrefined fish stick under conditions which are as mild as possible so as to avoid chemical decomposition of these complex organic compounds. Furthermore, many of the organic compounds obtained from animal or vegetable sources are of such a chemical nature as to lend themselves very readily to bacterial decomposition or decomposition by enzymes. I, therefore, believe it desirable to conduct the heating of the unrefined fish stick at a temperature sufficiently high to sterilize the material against bacterial and enzyme decomposition. It is my belief that a temperature within the range of about 150° F. to about 170° F. accomplishes such sterilization without any attendant thermal decomposition. Furthermore, the presence of oxygen alone or in conjunction with moisture can cause chemical reactions and decomposition or at least transformation of some of the desired proteins and vitamins. Consequently, by utilizing a non-oxidizing atmosphere, I avoid such undesirable chemical reactions.

The conditions under which I concentrate the unrefined fish stick are, therefore, mild enough to avoid thermal decomposition yet drastic enough to provide sterilization, yet at the same time I am enabled to remove a very appreciable portion of the original water content. The resultant product is not only fairly easy to handle, particularly before being cooled but more importantly it evidences unexpected stability in contrast with the extreme instability of prior art attempts to make similar products.

As stated above, I perform the single or multiple steps of concentration of the liquid in the presence of a non-oxidizing atmosphere. I may, and preferably do, add a reagent such as phosphoric acid to the finished product for reasons explained above. The material as so produced can readily be put into drums and sealed up for shipment and use as desired. In filling the drums with the material I prefer to fill the drums as completely as possible so as to leave no air space between the cover of the drum and the body of the contents within the drum thus eliminating as much as possible, even a small amount of an oxidizing atmosphere within the drum. It is within the contemplation of my invention to carry out the final step of filling the drums with my product in an atmosphere of carbon dioxide or nitrogen so as still further to avoid contacting the finished material with an oxidizing atmosphere. The drums when filled with the product in accordance with any of the procedures discussed above are then capped and sealed. It has been my observance that prior art products when placed within drums invariably undergo progressive decomposition, under the influence of chemical change gases which are generated and the ends of the drums will be observed to bulge out. At times the internal pressure of drums has been sufficient to rupture the drums. Any material which undergoes such progressive fermentation or decomposition will be found to have an undesirable odor and characteristics of putrefaction. Contrasted with these phenomena the product of my process when stored in drums for a plurality of months shows no evidence of internal pressure or expansion of the drum. On the contrary, practically every drum filled with my product shows a depression of its ends caused by contraction of the vapor space when the product is cooled to final temperature. Drums even after being stored for a plurality of months are found upon opening to contain a product which has its original odor, color, consistency and palatability as a livestock and poultry feed.

I claim:

1. A process of treating unrefined fish stick which comprises the following steps: charging a spray of unrefined fish stick containing its naturally occurring dissolved and undissolved solids and nonaqueous materials in undiminished quantity and while at its natural pH value into a dehydrating zone and removing moisture from said fish stick while maintaining a heated non-oxidizing atmosphere in said zone and while maintaining said fish stick at a temperature between about 150° F. and about 170° F., and separating concentrated fish stick from vaporized moisture and said atmosphere.

2. In a method of preparing a stable gel-like concentrate from unrefined fish stick the step which comprises heating a spray of unrefined fish stick containing its naturally occurring dissolved and undissolved solids and nonaqueous materials in undiminished quantity and while at its natural pH value to a temperature between about 150° F. and about 170° F. under atmospheric pressure and in the presence of hot products of combustion which contain substantially no free oxygen, separating the concentrated liquid material produced by such heating from the moisture evaporated from said fish stick and cooling said concentrated liquid to a gel-like mass.

3. A method of preparing a stable gel-like concentrate from unrefined fish stick which comprises heating a spray of unrefined fish stick to a temperature between about 150° F. and about 170° F. in the presence of hot products of combustion which contain substantially no free oxygen, separating the concentrated liquid material produced by such heating from the moisture evaporated from said fish stick, adding between about 0.5% and about 5% of phosphoric acid to the concentrated liquid and cooling said concentrated liquid to a gel-like mass.

4. A method of preparing a stable gel-like concentrate from unrefined fish stick which comprises heating a spray of unrefined fish stick to a temperature between about 150° F. and about 170° F. in the presence of hot products of combustion which contain substantially no free oxygen, separating the concentrated liquid material produced by such heating from the moisture evaporated from said fish stick, adding sufficient phosphoric acid to the warm concentrated liquid to adjust the pH of said concentrated liquid to about 5.5 and cooling said concentrated liquid to a gel-like mass.

5. A method of preparing a stable gel-like concentrate, suitable for stock and poultry feed, from unrefined fish stick containing its naturally occurring dissolved and undissolved solids and nonaqueous materials in undiminished quantity and while at its natural pH value which comprises heating a spray of unrefined fish stick possessing a water content of about 94% to a temperature between about 150° F. and about 170° F. and in the presence of hot products of combustion, which are largely carbon dioxide and which contain substantially no oxygen, until the water content of said fish stick is reduced to about 50% by weight of the concentrated liquid, and separating the hot products of combustion together with vaporized water from the concentrated liquid.

6. A method of preparing a stable gel-like concentrate, suitable for stock and poultry feed, from unrefined fish stick which comprises heating a spray of unrefined fish stick possessing a water content of about 94% to a temperature between about 150° F. and about 170° F. and in the presence of hot products of combustion, which are largely carbon dioxide and which contain substantially no oxygen, until the water content of said fish stick is reduced to about 50% by weight of the concentrated liquid, separating the hot products of combustion together with vaporized water from the concentrated liquid, and adding between about 0.5% to about 5.0% by weight of phosphoric acid to the said concentrated liquid.

7. A method of preparing a stable gel-like concentrate, suitable for stock and poultry feed, from unrefined fish stick containing its naturally occurring dissolved and undissolved solids and nonaqueous materials in undiminished quantity and while at its natural pH value which comprises heating a spray of unrefined fish stick possessing a water content of about 94% to a temperature between about 150° F. and about 170° F. and in the presence of hot products of combustion, which are largely carbon dioxide and other non-oxidizing gases, until the water content of said fish stick is reduced to about 50% by weight of the concentrated liquid, separating the hot products of combustion together with vaporized water from the concentrated liquid, discharging the said concentrated liquid, while warm, into drums, and sealing said drums in the absence of an oxidizing atmosphere.

8. A method of preparing a stable gel-like concentrate, suitable for stock and poultry feed, from unrefined fish stick containing its naturally occurring dissolved and undissolved solids and nonaqueous materials in undiminished quantity and while at its nautral pH value which comprises heating a spray of unrefined fish stick possessing a water content of about 94% to a temperature between about 150° F. and about 170° F. and in the presence of hot products of combustion, which are largely carbon dioxide and other non-oxidizing gases, until the water content of said fish stick is reduced to about 50% by weight of the concentrated liquid, separating the hot products of combustion together with vaporized water from the concentrated liquid, and adjusting the pH of the said concentrated liquid to about 5.5.

9. A method of preparing a stable, gel-like concentrate, suitable for a stock and poultry feed, from unrefined fish stick which comprises evaporating moisture from a spray of unrefined fish stick, which has an initial water to solids content ratio of about 9 to 1, while maintaining the said unrefined fish stick during said evaporation at a temperature between about 150° F. and about 170° F. and in the presence of hot gaseous products of combustion which are substantially non-oxidizing, until the water content of said fish stick is reduced to about 50% by weight of the concentrated liquid, separating said concentrated liquid from said hot gaseous products of combustion and from vaporized water, adjusting the pH of the said concentrated liquid to about 5.5 and then cooling the said liquid.

10. A method of preparing a stable, gel-like concentrate, suitable for stock and poultry feed, from unrefined fish stick which comprises evaporating moisture from a spray of unrefined fish stick, which has an initial water to solids content ratio of about 9 to 1, while maintaining the said unrefined fish stick during said evaporation at a temperature between about 150° F. and about 170° F. and in the presence of hot gaseous products of combustion which are substantially non-oxidizing, separating a partially concentrated liquid product from said hot gaseous products of combustion and from vaporized water, additionally evaporating moisture from said partially concentrated liquid while under sub-atmospheric pressure and at a temperature between about 100° F. and about 135° F. until the moisture content of said fish stick is reduced to about 50% by weight of the concentrated liquid and adjusting the pH of said concentrated liquid to about 5.5.

DANIEL B. VINCENT.

REFERENCES CITED

The following references are of record in the file of this patent:

UNITED STATES PATENTS

| Number | Name | Date |
|---|---|---|
| 1,988,678 | Arnold | Jan. 22, 1935 |
| 2,371,812 | Ernst | Mar. 20, 1945 |
| 2,454,315 | Gunther et al. | Nov. 23, 1948 |